United States Patent
Beaurepaire et al.

(10) Patent No.: US 11,180,062 B2
(45) Date of Patent: Nov. 23, 2021

(54) SEAT BACKREST WITH HEATING PANEL

(71) Applicant: Faurecia Sièges d'Automobile, Nanterre (FR)

(72) Inventors: Elise Beaurepaire, Cercottes (FR); Anne-Sophie Cabouillet, Boissy-le-Sec (FR)

(73) Assignee: FAURECIA SIÈGES D'AUTOMOBILE, Nanterre (FR)

( * ) Notice: Subject to any disclaimer, the term of this patent is extended or adjusted under 35 U.S.C. 154(b) by 0 days.

(21) Appl. No.: 16/394,393

(22) Filed: Apr. 25, 2019

(65) Prior Publication Data

US 2019/0329683 A1    Oct. 31, 2019

(30) Foreign Application Priority Data

Apr. 25, 2018 (FR) ...................... 18 53624

(51) Int. Cl.
| | |
|---|---|
| *B60N 2/56* | (2006.01) |
| *B60N 2/64* | (2006.01) |
| *B60N 2/70* | (2006.01) |

(52) U.S. Cl.
CPC ............. *B60N 2/5685* (2013.01); *B60N 2/64* (2013.01); *B60N 2/7017* (2013.01)

(58) Field of Classification Search
CPC ...... A47C 7/748; A47C 7/541; B60N 2/5685; B60N 2/64; B60N 2/7017
See application file for complete search history.

(56) References Cited

U.S. PATENT DOCUMENTS

| | | | | |
|---|---|---|---|---|
| 9,381,789 | B2* | 7/2016 | Ota | ...................... H05B 3/12 |
| 9,845,031 | B2* | 12/2017 | Oh | ...................... B60N 2/5664 |
| 2009/0289045 | A1* | 11/2009 | Hotary | ................. B60H 1/2225 |
| | | | | 219/202 |
| 2012/0168420 | A1* | 7/2012 | Ogino | ................ B60H 1/00285 |
| | | | | 219/217 |
| 2019/0335907 | A1* | 11/2019 | Tanaka | ..................... F24H 9/06 |

FOREIGN PATENT DOCUMENTS

| | | |
|---|---|---|
| DE | 102014208246 A1 | 11/2015 |
| EP | 3028894 A1 | 6/2016 |
| FR | 2939731 A1 | 6/2010 |

OTHER PUBLICATIONS

French Search Report corresponding to French application No. FR 1853624, dated Dec. 17, 2018, 2 pages.
Written Opinion corresponding to French application No. FR 1853624, dated Apr. 25, 2018, 4 pages.

* cited by examiner

Primary Examiner — Philip F Gabler
(74) Attorney, Agent, or Firm — Reising Ethington P.C.

(57) ABSTRACT

A seat for a passenger compartment, for example a vehicle passenger compartment. The seat has a backrest that includes a heating device for heating the space behind the backrest. The heating device includes, from front to back of the backrest, an insulating layer which is a foam, a heating layer, and an outer layer which forms the back of the backrest. The assembly of the insulating layer and the heating layer is achieved by compression on at least their peripheries.

10 Claims, 1 Drawing Sheet

SEAT BACKREST WITH HEATING PANEL

TECHNICAL FIELD

The present invention relates to a seat backrest comprising a heating device for heating the space behind the backrest.

In the present description, the terms "front", "rear", "back", and "behind" are defined with respect to the position of the seats in the passenger compartment, which conventionally are facing forward.

BACKGROUND

In a passenger compartment having front seats and rear seats, for example a passenger compartment of a vehicle, heated air is blown in from the front. As a result, the space behind the front seats receives less heated air than the space in front of the front seats, which leaves the passengers sitting in the rear seats at a disadvantage.

It is possible to integrate a heating device into the backrest of the seat, which allows a more direct heating of the space behind the front seats. However, current devices are lacking in performance, and their integration into the backrest is complex and therefore expensive.

The present invention aims to remedy these disadvantages.

SUMMARY

The invention, in at least some embodiments, aims to provide a seat backrest comprising a heating device that is able to efficiently provide heat to passengers sitting in the rear seats in a passenger compartment, the implementation of this backrest being simplified.

This object can be achieved due to the fact that the device comprises, from the front to the back of the backrest, an insulating layer which is a foam, a heating layer, and an outer layer which forms the back of the backrest, the assembly of the insulating layer and the heating layer being achieved by compression on at least their peripheries.

With these arrangements, a passenger sitting in a rear seat receives heat. The arrangement of the layers allows a more efficient heating of the space behind the front seats, and the assembly of the layers by compression simplifies the implementation of the backrest.

In some embodiments, the heating layer is in contact with the insulating layer over the entire surface of the heating layer facing the insulating layer, and the heating layer is in contact with the outer layer over the entire surface of the heating layer facing the outer layer.

The heating device is thus more compact.

In some other embodiments, the heating layer is separated from the outer layer by a first air layer, and the outer layer has holes for communication between the first air layer and the space behind the backrest, the heating layer and the outer layer being in contact with each other on their peripheries.

The heating of the space behind the backrest thus also occurs by convection through the holes.

The heating layer may be separated from the insulating layer by a second air layer, the heating layer and the insulating layer being in contact on their peripheries.

The heating device may further comprise a radiation-reflective layer, in contact with the insulating layer and between the second air layer and said insulating layer.

The heat emitted by the heating layer is thus directed more effectively to behind the backrest.

The invention also relates to a method for manufacturing a heating backrest of a seat.

According to at least some embodiments of the invention, this method comprises the following steps:

(a) An insulating layer which is a foam, a heating layer, and an outer layer intended for forming the back of the backrest are provided;

(b) These layers are positioned as follows, from front to back of the backrest: the insulating layer, then the heating layer, then the outer layer;

(c) These layers are then assembled, the insulating layer and the heating layer being assembled by compression on at least their peripheries.

Advantageously, before step (a), the insulating layer is created by spraying a foam on a plastic film.

Incorporation of the foam into the backrest is thus facilitated.

The heating layer and the outer layer may be assembled by compression on at least their peripheries.

Alternatively, the heating layer and the outer layer may be assembled by means other than compression on at least their peripheries.

Advantageously, in step (c), the layers may be assembled over their entire surfaces so that the heating layer is in contact with the insulating layer over the entire surface of the heating layer facing the insulating layer, and so that the heating layer is in contact with the outer layer over the entire surface of the heating layer facing the outer layer.

The heating device is thus more compact.

BRIEF DESCRIPTION OF DRAWINGS

The invention will be better understood and its advantages will be more apparent by reading the following detailed description of embodiments shown as non-limiting examples. The description refers to the accompanying drawings in which.

DETAILED DESCRIPTION

Figure 1:
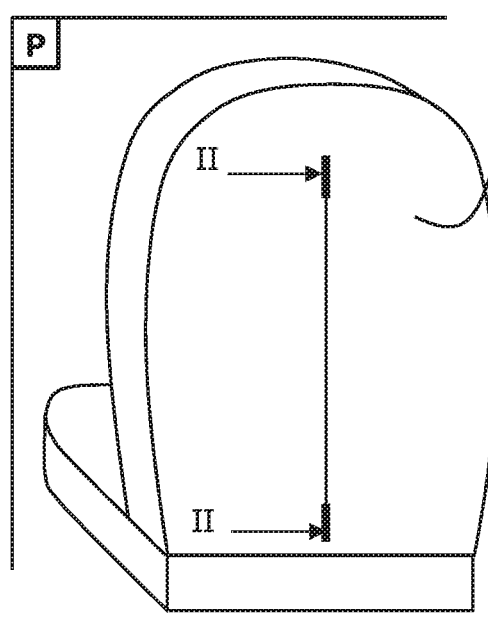
FIG. 1 is an illustration of a seat with a backrest according to an embodiment of the invention.

FIG. 1 is a perspective view from the rear of a seat having a backrest 10 provided with a heating device according to a first embodiment of the invention.

FIG. 1 schematically shows the backrest 10 and the seating portion of the seat, which is for example a vehicle seat, for example of a motor vehicle.

The backrest extends in a main plane P.

The front of the backrest refers to the face of the backrest intended to receive a passenger, called the front face.

The back of the backrest refers to the face (rear face) that is opposite the front face.

The visible face of the backrest 10 in FIG. 1 (and in FIG. 3) is therefore the rear face.

The backrest 10 comprises an outer layer 60, which is facing the space behind the seat.

The backrest 10 comprises a heating device. This device comprises, from the front to the back of the backrest 10, an insulating layer 20, a heating layer 40, and the outer layer 60.

Layer is understood to mean a substantially planar element which extends in a main plane and which has a thickness in a direction perpendicular to this plane, the thickness having a substantially smaller value (for example at least five times smaller) than the dimensions of the layer in the main plane.

When integrated into the backrest 10, the main plane of the insulating layer 20, heating layer 40, and outer layer 60 is the plane P.

Advantageously, the heating device extends over most of the surface area of the backrest 10, in order to heat the space behind the backrest more efficiently and uniformly.

The insulating layer 20 is a foam and is thermally insulating, in other words is made of a material having a low heat transfer coefficient. For example, this coefficient is less than 1 W/(m²K).

The insulating layer 20 is for example a polymer foam that is more or less rigid. For example, the polymer is a polyurethane.

As a result, heat transfer through the insulating layer 20 is reduced, and heat is thus transmitted essentially through the outer layer 60, which has a comparatively higher heat transfer coefficient than that of the insulating layer 20.

For example, this coefficient is greater than 20 W/(m²K).

The heat is transmitted through the outer layer 60 by conduction, then transmitted to the space behind the seat by conduction, radiation, and convection.

Figure 2:
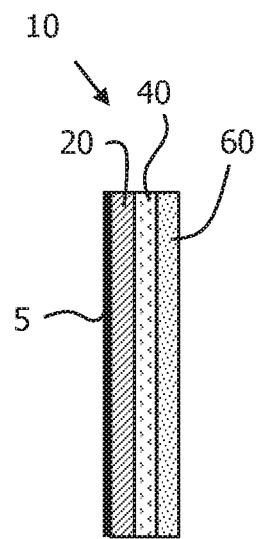
FIG. 2 is a partial cross-sectional view of the seat backrest of FIG. 1 along line II-II.

FIG. 2 is a cross-sectional view of a portion of the backrest 10 where the heating device is located. The insulating layer 20, the heating layer 40, and the outer layer 60 can be distinguished. These three layers are in paired contact, the heating layer being sandwiched between the insulating layer 20 and the outer layer 60.

In front of the insulating layer 20 is a front layer 5 which is in contact with a passenger when he or she is seated in the seat. This front layer 5 is for example a rigid shell covered with a flexible covering.

The heating device is thus integrated inside the backrest 10, and opens to the back of the backrest 10 through the rear face of the backrest 10.

The heating layer 40 is for example a heating mat which extends in the plane P, as shown in FIG. 2.

This heating mat consists for example of a support in which heating elements are integrated.

For example, this support is a fabric in which are woven resistive wires which are the heating elements.

Alternatively, this support is a matrix, for example a polymer matrix, in which are embedded resistive wires which are the heating elements.

Alternatively the heating mat consists exclusively of resistive wires.

In all cases, the heating layer 40 is connected to the heating system of the passenger compartment or vehicle in order to be supplied with energy and produce heat.

In this first embodiment, the assembly of the layers of the heating device is carried out not only at the peripheries of these layers, but also on all surfaces of the mutually facing layers such that the insulating layer 20, the heating layer 40, and the outer layer 60 are in paired contact, as illustrated in FIG. 2.

For the assembly of the insulating layer 20 and the heating layer 40 specifically, this assembly is achieved by compression. For this purpose, the heating layer 40 is pressed against the insulating layer 20 while the insulating layer 20 is still in the viscous state (in other words not yet solidified into foam). The attachment between the insulating layer 20 and the heating layer 40 then occurs by the combined action of the pressure of these layers against each other and the solidification of the foam of the insulating layer 20 from the viscous state.

Compared to other processes for manufacturing a multilayer structure, compression induces an interpenetration of the heating layer 40 and the insulating layer 20 as a structural characteristic.

In the present first embodiment, the assembly by compression of the insulating layer 20 and the heating layer 40 takes place not only at the periphery of these two layers, but also over the entire surfaces of these layers.

Periphery of a layer is understood to mean the region of the front or rear face of a layer (extending in its main plane P) which is located furthest from the geometric center of the layer.

A second embodiment of the invention will now be described with reference to FIGS. 3, 4, and 5.

As in the first embodiment, the heating device comprises, from the front to the back of the backrest 10, an insulating layer 20, a heating layer 40 in contact with the insulating layer 20, and an outer layer 60.

However, the heating layer 40 is separated from the outer layer 60 by a first air layer 50, and the outer layer 60 has holes 65 which place the first air layer 50 in communication with the space behind the backrest 10.

The first air layer 50 is directly heated by the heating layer 40. The holes 65 allow air to flow from the first air layer 50 to the space behind the backrest 10, which heats this space by conduction, convection, and radiation.

Advantageously, the holes 65 are regularly distributed over the surface area of the heating device, so that the heat is distributed over the entire surface area of the backrest 10.

Figure 3:
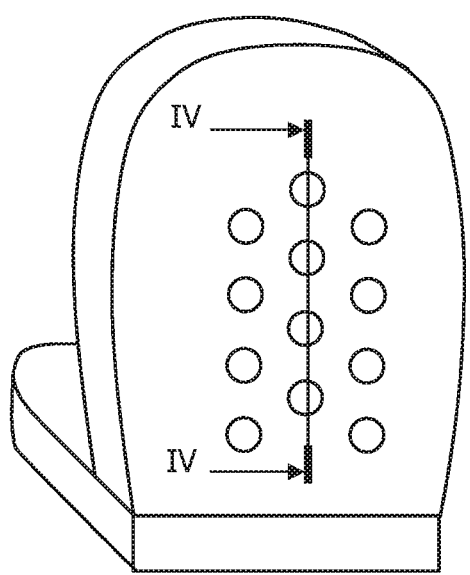
FIG. 3 is an illustration of a seat with another embodiment of a backrest according to the invention.

FIG. 3 is a perspective rear view of a seat provided with a heating device according to this other embodiment of the invention.

Figures 4, 5:
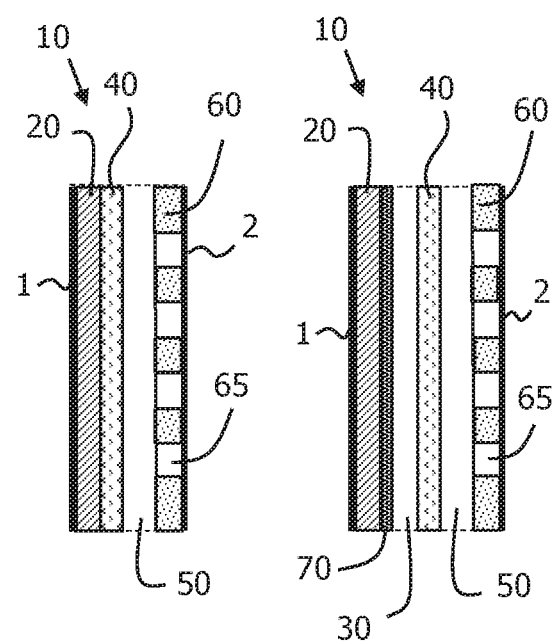
FIG. 4 is a partial cross-sectional view of the seat backrest of FIG. 3 along line IV-IV.
FIG. 5 is a variant of the seat backrest of FIG. 4.

FIG. 4 is a cross-sectional view of a portion of the backrest 10 where the heating device is located.

A variant of this embodiment of the invention is illustrated in FIG. 5. The heating device again comprises, from the front to the back of the backrest 10, an insulating layer 20, a heating layer 40, a first air layer 50, and an outer layer 60 which has holes 65 placing the first air layer 50 in communication with the space behind the backrest 10.

In addition, the heating layer 40 is separated from the insulating layer 20 by a second air layer 30.

Advantageously, as represented in FIG. 5, the heating device further comprises a radiation-reflective layer 70 which is in contact with the insulating layer 20 and lies between the second air layer 30 and the insulating layer 20.

This reflective layer 70 makes it possible to improve the redistribution towards the back of the backrest 10 of the heat diffused by the heating layer 40 towards the front of the backrest 10.

In this second embodiment, the layers of the heating device are assembled only at the peripheries of these layers, in order to leave air layers between the heating layer 40 and the outer layer 60, and where appropriate between the heating layer 40 and the insulating layer 20.

Thus, in this second embodiment, the assembly of the insulating layer 20 and the heating layer 40 is achieved by compression as described in the first embodiment, but only on the periphery of these two layers.

For example, one can assemble a rigid front shell 1, the heating device, and a rigid rear shell 2, the heating device being sandwiched between the front shell 1 and rear shell 2 and being fixed to each of these two shells at its periphery.

Thus, with respect to the methods for manufacturing a heating backrest 10 of a seat, these methods each include the following steps, as described above:

(a) An insulating layer 20 which is a foam, a heating layer 40, and an outer layer 60 intended for forming the back of the backrest 10 are provided;

(b) These layers are positioned as follows, from front to back of the backrest 10: the insulating layer 20, then the heating layer 40, then the outer layer 60;

(c) The layers are then assembled, the insulating layer 20 and the heating layer 40 being assembled by compression on at least their peripheries.

For example, before step (a), the insulating layer 20 is created by spraying a foam on a plastic film.

In all cases, the assembly by compression between the insulating layer 20 and the heating layer 40 is carried out as described above.

With regard to the heating layer 40 and the outer layer 60, according to a first assembly mode, the heating layer 40 and the outer layer 60 are assembled by compression on their peripheries only.

Alternatively, as illustrated in FIG. 1, the insulating layer 20, the heating layer 40, and the outer layer 60 are assembled by compression over their entire surface.

Thus, according to a first mode of assembling the heating layer 40 and the outer layer 60, the heating layer 40 and the outer layer 60 are assembled by compression at least on their peripheries.

According to a second mode of assembly, the heating layer 40 and the outer layer 60 are assembled by means other than compression, for example a means selected from the group comprising gluing, mechanical connection, and printing the heating layer 40 on the outer layer 60. Depending on the case, this assembly takes place either at the peripheries of these layers only, or also over their entire surface.

Thus, according to a second mode of assembling the heating layer 40 and the outer layer 60, the heating layer 40 and the outer layer 60 are assembled by means other than compression at least on their peripheries.

The invention claimed is:

1. A seat backrest extending in a main plane and comprising a heating device for heating a space behind the backrest, wherein said heating device comprises, from a front of said backrest to a back of said backrest, an insulating layer which is a foam, a heating layer, and an outer layer which forms the back of said backrest, said insulating layer and said heating layer being assembled together by compression on at least their peripheries, wherein each of said layers is a substantially planar element which extends in said main plane, wherein said heating device is integrated inside the backrest and extends exclusively over a majority of the surface area of the backrest.

2. The seat backrest according to claim 1, wherein said heating layer is in contact with said insulating layer over an entire surface of said heating layer facing said insulating layer, and wherein said heating layer is in contact with said outer layer over an entire surface of said heating layer facing said outer layer.

3. The seat backrest according to claim 1, wherein said heating layer is separated from said outer layer by a first air layer, and wherein said outer layer has holes for communication between said first air layer and the space behind said backrest, said heating layer and said outer layer being in contact with each other on their peripheries.

4. The seat backrest according to claim 3, wherein said heating layer is separated from said insulating layer by a second air layer, said heating layer and said insulating layer being in contact on their peripheries.

5. The seat backrest according to claim 4, wherein said heating device further comprises a radiation-reflective layer, in contact with said insulating layer and between said second air layer and said insulating layer.

6. A method for manufacturing a heating backrest of a seat, said backrest extending in a main plane, the method comprising the following steps:

(a) providing an insulating layer which is a foam, a heating layer, and an outer layer intended for forming a back of said backrest;

(b) positioning said layers, from a front to the back of said backrest, as follows: said insulating layer, then said heating layer, then said outer layer, wherein each of said layers is a substantially planar element which extends in said main plane, wherein said layers are integrated inside the backrest and extend exclusively over a majority of the surface area of the backrest; and (c) assembling said layers to form a heating device for heating a space behind the backrest, wherein said insulating layer and said heating layer are assembled by compression on at least their peripheries.

7. The method for manufacturing a seat backrest according to claim 6, wherein, before step (a), said insulating layer is created by spraying a foam on a plastic film.

8. The method for manufacturing a seat backrest according to claim 6, wherein said heating layer and said outer layer are assembled by compression on at least their peripheries.

9. The method for manufacturing a seat backrest according to claim 6, wherein said heating layer and said outer layer are assembled without compression on at least their peripheries.

10. The method for manufacturing a seat backrest according to claim 6, wherein, in step (c), said layers are assembled over their entire surfaces so that said heating layer is in contact with said insulating layer over an entire surface of said heating layer facing said insulating layer, and wherein said heating layer is in contact with said outer layer over an entire surface of said heating layer facing said outer layer.

* * * * *